United States Patent [19]

Pomerantz et al.

[11] 4,099,167

[45] Jul. 4, 1978

[54] CAPACITIVE MEANS FOR MEASURING THE LEVEL OF A LIQUID

[75] Inventors: Daniel I. Pomerantz, Lexington; Louis M. Sandler, North Reading, both of Mass.

[73] Assignee: P.R. Mallory & Co. Inc., Indianapolis, Ind.

[21] Appl. No.: 767,533

[22] Filed: Feb. 10, 1977

[51] Int. Cl.² .................... G08B 21/00; G01F 23/00
[52] U.S. Cl. ............................ 340/620; 73/304 C; 361/284
[58] Field of Search ............... 340/244; 361/284, 330; 73/304 C

[56] References Cited

U.S. PATENT DOCUMENTS

| | | | |
|---|---|---|---|
| 2,648,804 | 8/1953 | Steigerwalt et al. | 361/330 X |
| 3,218,863 | 11/1965 | Calvert | 361/284 X |
| 3,588,859 | 6/1971 | Petree | 361/284 X |
| 3,935,739 | 2/1976 | Ells | 73/304 C |
| 3,939,360 | 2/1976 | Jackson | 340/244 C X |

Primary Examiner—John W. Caldwell, Sr.
Assistant Examiner—Daniel Myer
Attorney, Agent, or Firm—Hoffmann, Meyer & Coles

[57] ABSTRACT

Electrodes are disposed on portions of a container comprising dielectric material, an electrical signal is capacitively transmitted between said electrodes, said electrical signal is shunted by the presence of a liquid in close proximity to said electrodes, and said shunting is detected.

27 Claims, 8 Drawing Figures

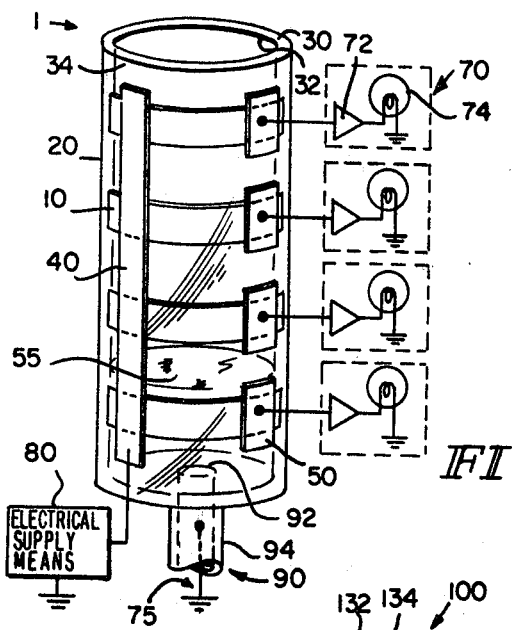
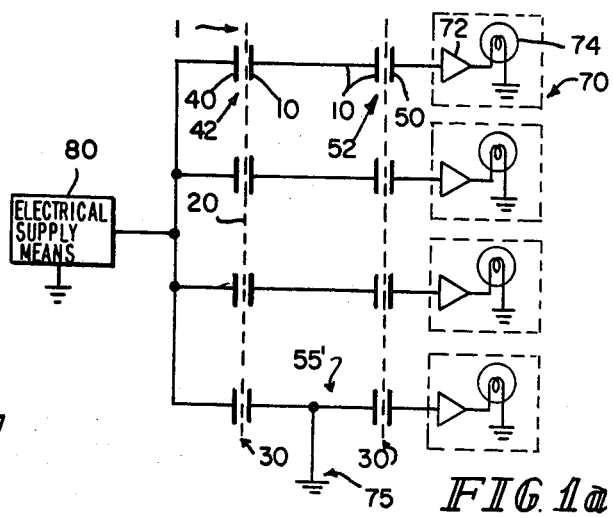
FIG.1
FIG.1a
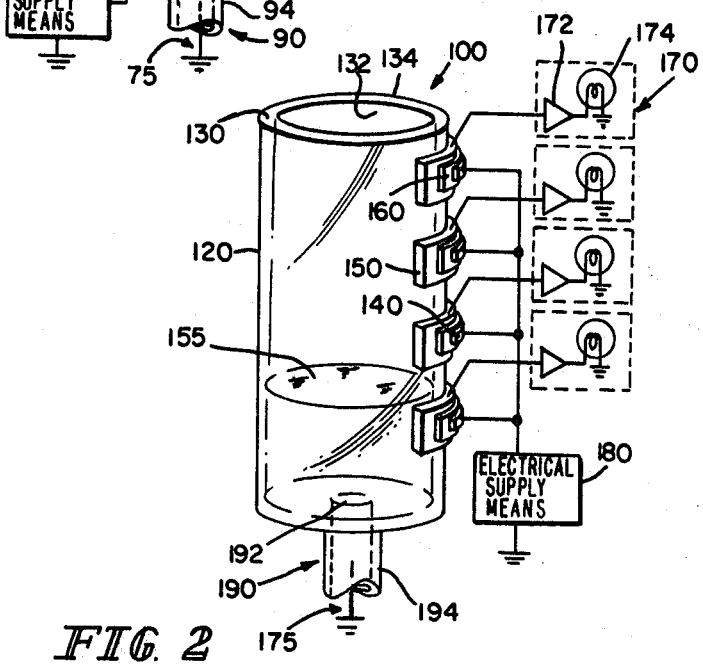
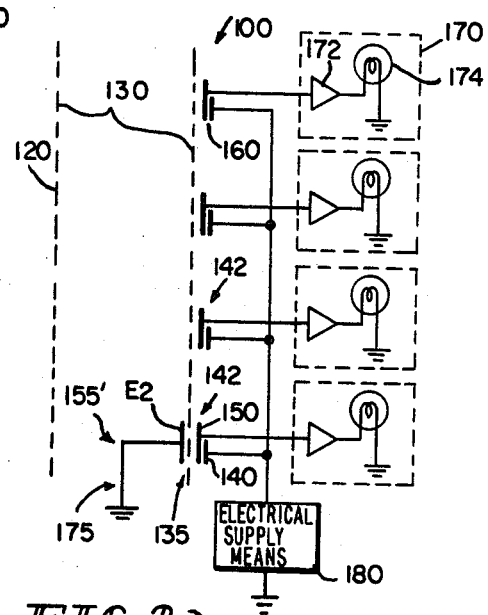
FIG.2
FIG.2a

CAPACITIVE MEANS FOR MEASURING THE LEVEL OF A LIQUID

BACKGROUND OF THE INVENTION

Generally speaking, the present invention relates to a means for measuring the level of a liquid and more specifically to a capacitive means for measuring the level of a liquid comprising a container wherein said level of said liquid may be measured, at least one cluster of at least two electrodes each of which is situated adjacent to said container, a means electrically coupled to at least one of said electrodes of said cluster for supplying an electrical signal thereto, and a means for shunting said electrical signal when said liquid is in close proximity to at least one of said electrodes of said cluster.

Means for measuring the level of a liquid which include a container wherein the level of a liquid may be measured, at least two electrodes each of which is situated adjacent to the container, and a means electrically coupled to at least one of the electrodes for supplying an electrical signal thereto, have generally been classified as capacitive means and as such are generally known in the art e.g. Radin U.S. Pat. No. 3,641,544 issued Feb. 8, 1972 and Cohen U.S. Pat. No. 2,433,599 issued Dec. 30, 1947. However, previous capacitive means have utilized the liquid to transmit an electrical signal between two electrodes when the liquid is in close proximity to the electrodes thereby completing an electrical circuit. Accordingly, in previous capacitive means the completion of the electrical circuit was necessary in order to detect the desired level of the liquid. As a result of this feature the absence of an electrical signal due to the failure of electronics or any other parts of the capacitive means resulted in a complete failure of the capacitive means itself. Therefore, there were no built-in fail safe provisions in previous capacitive means. Furthermore, since previous capacitive means were dependent upon the transmission of an electrical signal by the liquid it was necessary that the liquid be isolated from ground potential; otherwise, the signal would be shunted thereby preventing it from reaching the receiver electrode and eliminating the detection of the signals presence.

SUMMARY OF THE INVENTION

Accordingly, it is a feature of the present invention to provide a capacitive means for measuring the level of a liquid which includes self-contained fail safe provisions. Another feature of the present invention is to provide a capacitive means for measuring the level of a liquid which does not require that the liquid to be measured be isolated from ground potential. Yet another feature of the present invention is to provide a capacitive means for measuring the level of a liquid wherein an electrical signal is transmitted between two electrodes in the absence of the liquid and the presence of the liquid shunts the electrical signal to ground potential. Yet another feature of the present invention is to provide a capacitive means for measuring the level of a liquid comprising a container wherein the level of the liquid may be measured, at least one cluster of at least two electrodes each of which is situated adjacent to the container, a means electrically coupled to at least one of the electrodes of the cluster for supplying an electrical signal thereto, and a means for shunting the electrical signal when the liquid is in close proximity to at least one of the electrodes of the cluster. Still another feature of the present invention is to provide a method for measuring the level of a liquid comprising the steps of providing a container at least a portion of which comprises a dielectric material, disposing at least two electrodes in spaced relation on the portion of the container, electrically coupling at least one of the electrodes to a means for supplying an electrical signal whereby said electrical signal is capacitively transmitted between the electrodes, and shunting the electrical signal when the liquid is in close proximity to at least one of the electrodes whereby a desired liquid level may be detected.

These and other features will become apparent from the following description when viewed in conjunction with the accompanying drawings which follow:

BRIEF DESCRIPTION OF THE DRAWINGS

FIG. 1 is a first embodiment of a capacitive means for measuring the level of a liquid.

FIG. 1a is an equivalent electrical circuit of the embodiment of a capacitive means for measuring the level of a liquid as shown in FIG. 1.

FIG. 2 is a second embodiment of a capacitive means for measuring the level of a liquid.

FIG. 2a is an equivalent electrical circuit of the embodiment of a capacitive means for measuring the level of a liquid as shown in FIG. 2.

DESCRIPTION OF THE PREFERRED EMBODIMENT

Figure 3:
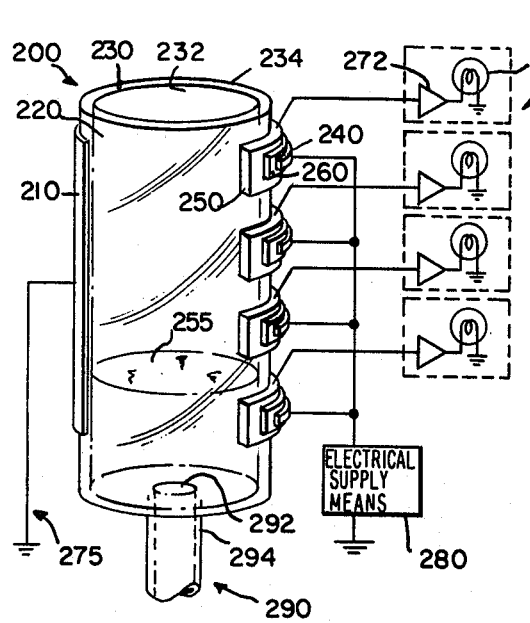
FIG. 3 is a third embodiment of a capacitive means for measuring the level of a liquid.

Referring to FIG. 1 an embodiment of a capacitive means 1 for measuring the level of a liquid 55 includes a container 20; electrodes 40, 50 and 10; a means 80 for supplying an electrical signal; a means 75 for shunting the electrical signal; a means 70 for detecting the level of the liquid 55; and a means 90 for supplying the liquid 55 to the container 20.

In the embodiment shown in FIG. 1, container 20 is cylindrical in shape having a wall 30 which comprises a dielectric material. Wall 30 includes an inner surface 32 and an outer surface 34. A means 90 for supplying the liquid 55 to the container 20 is coupled to the container 20 and includes an aperture 92 in the container 20 and a tube 94 coupled to the aperture 92. However, many means for supplying a liquid to a container exist and therefore it is not intended that this embodiment of the invention necessarily be limited to the means 90 for supplying the liquid 55 as described hereinabove.

An electrode 40 is disposed on the outer surface 34 of wall 30 and electrically coupled to a means 80 for supplying an electrical signal thereto. Another electrode 50 is also disposed on the outer surface 34 of wall 30 in parallel relation to electrode 40. Electrode 50 is further electrically coupled to a means 70 for detecting the level of the liquid 55. Another electrode 10 (represented by dotted lines FIG. 1) is disposed on the inner surface 32 of wall 30 in spaced parallel relation to electrode 40 and electrode 50 thereby establishing a capacitance between electrodes 40 and 10 and electrodes 10 and 50.

Accordingly, means 80 supplies an electrical signal to electrode 40 which is capacitively transmitted between electrodes 40, 10, and 50 to means 70 for detecting the level of the liquid 55. Where it is desireous that more than a single level of the liquid 55 be measured, a plurality of electrodes 40, 10 and 50 situated in clusters as described above may be disposed vertically along wall 30. As shown, electrode 40 may be elongated vertically along wall 30 whereby only one electrode 40 is required when measuring more than a single level; however, a plurality of electrodes 10 and 50 must be used in this embodiment in order to measure more than one level of the liquid 55.

A means 75 for shunting the electrical signal being capacitively transmitted between electrodes 40, 10 and 50 includes the liquid 55 at ground potential wherein the liquid 55 is electrically conductive. When the liquid 55 is in electrical contact with electrode 10, the electrical signal is prevented from reaching electrode 50 because it is shunted to ground potential by the liquid 55.

A means 80 for supplying an electrical signal may be any conventional AC or pulsed source. A means 70 for detecting the level of the liquid 55 is shown in FIG. 1 as including a detector/amplifier 72 and an indicator light 74. However, it is not intended that this embodiment of the invention be limited to the means 70 as hereinabove described for detecting the level of the liquid 55. In fact detecting means 70 could include an electronic control circuit for controlling or activating desired functions in response to the detection of the shunting of the electrical signal.

Referring to FIG. 1a, in operation, means 80 for supplying an electrical signal supplies an input signal to a capacitor 42 which includes electrodes 40 and 10. The electrical signal is capacitively transmitted from electrode 40 through wall 30 which comprises a dielectric material to electrode 10. In the absence of the liquid 55 the electrical signal is capacitively transmitted from electrode 10 back through wall 30 to electrode 50. Electrodes 10 and 50 comprise a capacitor 52 and from capacitor 52 the electrical signal is transmitted to means 70 for detecting the level of the liquid 55 whereby the absence of liquid 55 is detected. In the presence of the liquid 55 in electrical contact with electrode 10, represented as 55' in FIG. 1a, means 75 for shunting the electrical signal will cause substantially all of the electrical signal to be shunted to ground potential away from capacitor 52 and therefore away from means 70 for detecting the level of the liquid 55. The absence of the electrical signal at means 70 for detecting the level of the liquid 55 will cause a change in its operating conditions whereby the presence of liquid 55 is detected. Where a plurality of levels are being measured, as the liquid 55 represented as 55' in FIG. 1a makes electrical contact with an electrode 10 from each cluster of electrodes 40, 10, and 50 the presence of the liquid 55 at that level will be detected.

Referring to FIG. 2 an embodiment of a capacitive means 100 for measuring the level of a liquid 155 includes a container 120; electrodes 140 and 150; a means 180 for supplying an electrical signal; a means 175 for shunting the electrical signal; a means 170 for detecting the level of the liquid 155; and a means 190 for supplying the liquid 155 to the container 120.

In the embodiment shown in FIG. 2, container 120 is cylindrical in shape having a wall 130 which comprises a dielectric material. Wall 130 includes an inner surface 132 and an outer surfacer 134. A means 190 for supplying the liquid 155 to the container 120 is coupled to the container 120 and includes an aperture 192 in the container 120 and a tube 194 coupled to the aperture 192. As previously indicated and reiterated here, it is not intended that this embodiment of the invention necessarily be limited to the means 190 for supplying the liquid 155 as described hereinabove.

An electrode 140 is disposed on the outer surface 134 of wall 130 and electrically coupled to a means 180 for supplying an electrical signal thereto. Another electrode 150 is also disposed in the outer surface 134 of wall 130 in spaced parallel relation to electrode 140. Electrode 150 is further electrically coupled to a means 170 for detecting the level of the liquid 155. An insulator 160 comprising a dielectric material is interposed between electrodes 140 and 150 thereby establishing a capacitance therebetween. Accordingly, means 180 supplies an electrical signal to electrode 140 which is capacitively transmitted first to electrode 150 and thereafter to means 170 for detecting the level of the liquid 155. Again where it is desireous that more than a single level of the liquid 155 be measured, a plurality of electrodes 140 and 150 situated in clusters as described above may be disposed vertically along wall 130.

A means 175 for shunting the electrical signal being capacitively transmitted between electrodes 140 and 150 includes the liquid 155 at ground potential wherein the liquid 155 must be electrically conductive and the impedance of the liquid 155 to ground potential is very low. When the liquid 155 is in close proximity to electrode 150 the electrical signal is prevented from reaching means 170 for detecting the level of the liquid 155 because it is shunted to ground potential by the liquid 155.

As in the embodiment shown in FIG. 1, a means 180 for supplying an electrical signal may be any conventional AC or pulsed source. A means 170 for detecting the level of the liquid 155 is shown as including a detector/amplifier 172 and an indicator light 174. However, it is again not intended that this embodiment of the invention be limited to the means 170 as previously described for detecting the level of the liquid 155.

Referring to FIG. 2a, in operation, means 180 for supplying an electrical signal supplies an input signal to a capacitor 142 which includes electrodes 140 and 150. The electrical signal is capacitively transmitted from electrode 140 through an insulator 160 to electrode 150. In the absence of the liquid 155 the electrical signal is transmitted from capacitor 142 directly to means 170 for detecting the level of the liquid 155 whereby the absence of the liquid 155 is detected. In the presence of the liquid 155 in close proximity to electrode 150, represented as 155' in FIG. 2a, a capacitor 135 includes an electrode 150 and the surface of liquid 155 (represented by E2 in FIG. 2a). Means 175 for shunting the electrical signal which includes the liquid 155 at ground potential will cause substantially all of the electrical signal to be shunted to ground potential through capacitors 142 and 135 and therefore away from means 170 for detecting the level of the liquid 155. The absence of the electrical signal at means 170 for detecting the level of the liquid 155 will cause a change in its operating conditions whereby the presence of the liquid 155 is detected. Where a plurality of levels are being measured, as the liquid 155 represented as 155' in FIG. 2a comes in close proximity to an electrode 150 from each cluster of electrodes 140 and 150 the presence of the liquid 155 at that level will be detected.

Referring to FIG. 3 an embodiment of a capacitive means 200 for measuring the level of a liquid 255 includes a container 220; electrodes 240, 250, and 210; a means 280 for supplying an electrical signal; a means 275 for shunting the electrical signal; a means 270 for detecting the level of the liquid 255; and a means 290 for supplying the liquid 255 to the container 220.

In the embodiment shown in FIG. 3, container 220 is cylindrical in shape having a wall 230 which comprises a dielectric material. Wall 230 includes an inner surface 232 and an outer surface 234. A means 290 for supplying the liquid 255 to the container 220 is coupled to the container 220 and includes an aperture 292 in the container 220 and a tube 294 coupled to the aperture 292. Again, it is not intended that this embodiment of the invention necessarily be limited to the means 290 for supplying the liquid 255 as described hereinabove.

An electrode 240 is disposed on the outer surface 234 of wall 230 and electrically coupled to a means 280 for supplying an electrical signal thereto. Another electrode 250 is also disposed on the outer surface 234 of wall 230 in spaced parallel relation to electrode 240. Electrode 250 is further electrically coupled to a means 270 for detecting the level of the liquid 255. An insulator 260 comprising dielectric material is interposed between electrodes 240 and 250 thereby establishing a capacitance therebetween. Another electrode 210 is also disposed on the outer surface 234 of wall 230 opposing and in spaced relation to electrode 250. Electrode 210 is further electrically coupled to ground potential. Accordingly, means 280 supplies an electrical signal to electrode 240 which is capacitively transmitted between electrodes 240 and 250 to means 270 for detecting the level of the liquid 255. Electrode 210 must be spaced sufficiently remote from electrode 250 so that any capacitance which may be established between electrodes 250 and 210 is negligible in the absence of the liquid 255. Accordingly, even though it is not necessary that electrode 210 be in spaced parallel relation to electrode 250 electrode 210 would optimally be diametrically opposed to electrode 250. Again where it is desireous that more than a single level of the liquid 255 be measured, a plurality of electrodes 240, 210, and 250 situated in clusters as described above may be disposed vertically along wall 230. As shown, electrode 210 may be elongated vertically along wall 230 whereby only one electrode 210 is required when measuring more than a single level.

A means 275 for shunting the electrical signal being capacitively transmitted between electrodes 240 and 250 includes electrode 210 at ground potential wherein shunting occurs when the electrically conductive liquid 255 is in close proximity to electrodes 250 and 210. When the liquid 255 is in close proximity to electrodes 250 and 210 the electrical signal is prevented from reaching means 270 for detecting the level of the liquid 255 because it is shunted to ground potential by electrode 210 through the liquid 255. Accordingly, the electrical path across the liquid 255 must be sufficiently short to allow for a low impedance.

As in the embodiment shown in FIG. 1 a means 280 for supplying an electrical signal may be any conventional AC or pulsed source. Also as previously stated, a means 270 for detecting the level of the liquid 255 includes a detector/amplifier 272 and an indicator light 274. However, it is reiterated that it is not intended that this embodiment of the invention be limited to the means 270 as described for detecting the level of the liquid 255.

Figure 3A:
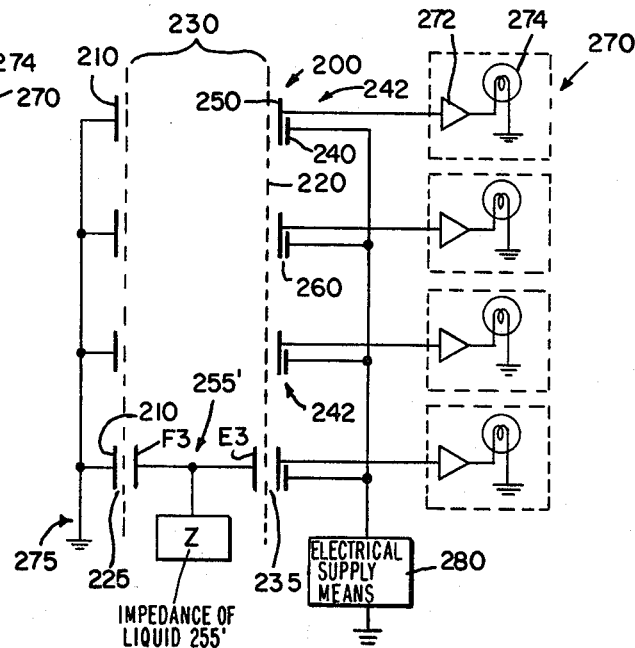
FIG. 3a is an equivalent electrical circuit of the embodiment of a capacitive means for measuring the level of a liquid as shown in FIG. 3.

Referring to FIG. 3a, in operation, means 280 for supplying an electrical signal supplies an input signal to a capacitor 242 which includes electrodes 240 and 250. The electrical signal is capacitively transmitted from electrode 240 through an insulator 260 to electrode 250. In the absence of the liquid 255 the electrical signal is transmitted from capacitor 242 directly to means 270 for detecting the level of the liquid 255 whereby the absence of the liquid 255 is detected. The capacitance between electrodes 210 and 250 is negligibly small in the absence of the liquid 255 and therefore the impedance between these electrodes is too large to shunt the electrical signal to ground. In the presence of the liquid 255 in close proximity to electrodes 210 and 250, represented as 255′ in FIG. 3a, a capacitance is established between electrode 250 and the surface of liquid 255 (represented by E3 in FIG. 3a) forming a capacitor 235 and a capacitance is established between electrode 210 and the surface of liquid 255 (represented by F3 in FIG. 3a) forming a capacitor 225. With the liquid in close proximity to electrodes 210 and 250 the large impedance which previously existed between electrodes 250 and 210 in the absence of liquid 255 is reduced to a very small impedance thereby providing a path of low impedance for the electrical signal to be transmitted between electrodes 250 and 210. This embodiment of the invention is particularly applicable where the impedance Z which would exist if the liquid 255 were at ground potential as shown in FIG. 2 is very large therefore making it difficult to shunt the signal to ground potential by the liquid 255.

A means 275 for shunting the electrical signal which includes electrode 210 at ground potential will cause substantially all of the electrical signal to be shunted to ground potential away from capacitor 242 and therefore away from means 270 for detecting the level of the liquid 255. The absence of the electrical signal at means 270 for detecting the level of liquid 255 will cause a change in its operating conditions whereby the presence of liquid 255 is detected. Where a plurality of levels are being measured as the liquid 255 represented as 255′ in FIG. 3a comes in close proximity to electrodes 210 and 250 from each cluster of electrodes 210, 250 and 240 the presence of the liquid 255 at that level will be detected.

Figure 4:
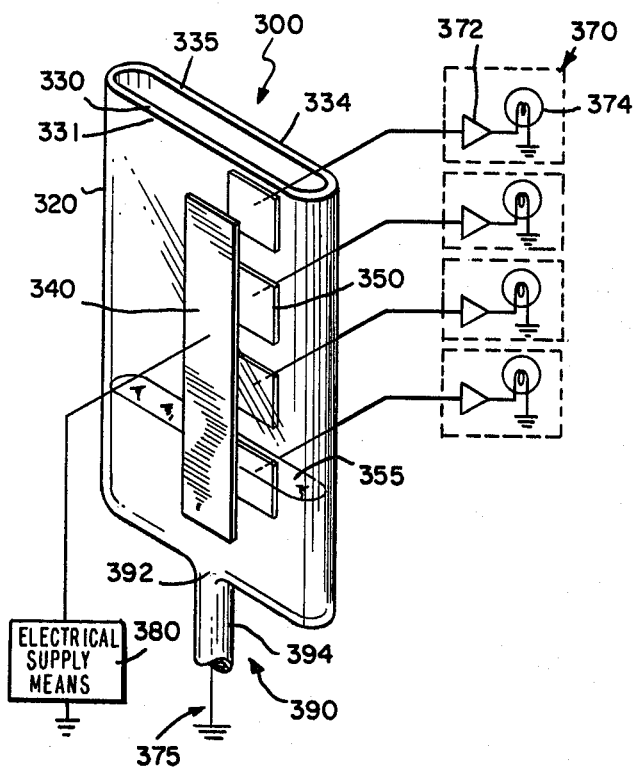
FIG. 4 is a fourth embodiment of a capacitive means for measuring the level of a liquid.

Referring to FIG. 4 an embodiment of a capacitive means 300 for measuring the level of a liquid 355 includes a container 320; electrodes 340 and 350; a means 380 for supplying an electrical signal; a means 375 for shunting the electrical signal; a means 370 for detecting the level of the liquid 355; and a means 390 for supplying the liquid 355 to the container 320.

In the embodiment shown in FIG. 4, container 320 is rectangular in shape having two walls 330 and 335 each comprising a dielectric material. Wall 335 includes an outer surface 234 and wall 330 includes an outer surface 331. A means 390 for supplying the liquid 355 to the container 320 is coupled to the container 320 and includes an aperture 392 in the container 320 and a tube 394 coupled to the aperture 392. As previously stated, it is not intended that this embodiment of the invention necessarily be limited to the means 390 for supplying the liquid 355 as described hereinabove.

An electrode 340 is disposed on the outer surface 331 of wall 330 and electrically coupled to a means 380 for supplying an electrical signal thereto. Another electrode 350 is disposed on the outer surface 334 of wall 335 in spaced parallel relation to electrode 340. Electrode 350 is further electrically coupled to a means 370 for detecting the level of the liquid 355. Container 320 is structured such that the distance between walls 335 and 330 is relatively small whereby a substantial capacitance is established between electrodes 340 and 350. Accordingly, means 380 supplies an electrical signal to electrode 340 which is capacitively transmitted between electrodes 340 and 350 to means 370 for detecting the level of the liquid 355. Again, where it is desirous that more than a single level of the liquid 355 be measured, a plurality of electrodes 340 and 350 situated in clusters as described above may be diposed vertically along walls 330 and 335. As shown, electrode 340 may be elongated vertically along wall 331 whereby only one electrode 340 is required when measuring more than a single level; however, a plurality of electrodes 350 must be used in this embodiment in order to measure more than a single level of the liquid 355.

A means 375 for shunting the electrical signal being capacitively transmitted between electrodes 340 and 350 includes the liquid 355 at ground potential wherein the liquid 355 is electrically conductive and has a low impedance. When the liquid 355 is in close proximity to electrodes 340 and 350 the electrical signal is prevented from reaching electrode 350 because it is shunted to ground potential by the liquid 355.

As in the embodiment shown in FIG. 1 a means 380 for supplying an electrical signal may be any conventional AC or pulsed source. Also as shown a means 370 for detecting the level of the liquid 355 includes a detector/amplifier 372 and an indicator light 374. However, it is again reiterated that it is not intended that this embodiment of the invention be limited to the means 370 as described for detecting the level of the liquid 355.

Figure 4A:
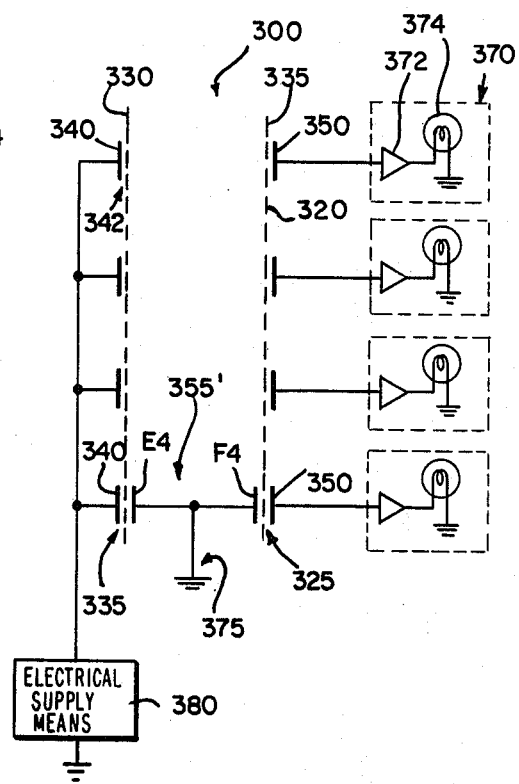
FIG. 4a is an equivalent electrical circuit of the embodiment of a capacitive means for measuring the level of a liquid as shown in FIG. 4.

Referring to FIG. 4a, in operation, means 380 for supplying an electrical signal supplies an input signal to a capacitor 342 which comprises electrodes 340 and 350. The electrical signal is capacitively transmitted from electrode 340 through walls 330 and 335 each comprising dielectric material to electrode 350.

In the absence of the liquid 355 the electrical signal is transmitted from capacitor 342 directly to means 370 for detecting the level of the liquid 355 whereby the absence of the liquid 355 is detected. The distance between walls 330 and 335 must be small enough so that a substantial capacitance is established between electrodes 340 and 350. In the presence of the liquid 355 in close proximity to electrodes 340 and 350, represented as 355' in FIG. 4a, a capacitance is established between electrode 340 and the surface of liquid 355 (represented by E4 in FIG. 4a) forming a capacitor 335 and a capacitance is established between electrode 350 and the surface of liquid 355 (represented by F4 in FIG. 4a) forming a capacitor 325. However, the capacitance of capacitor 325 is substantially negligible. A means 375 for shunting the electrical signal which includes the liquid 355 at ground potential will cause substantially all of the electrical signal to be shunted to ground potential through capacitor 335 and therefore away from electrode 350 and means 370 for detecting the level of the liquid 355. The absence of the electrical signal at means 370 for indicating the level of the liquid 355 will cause a change in its operating conditions whereby the presence of liquid 355 is indicated. Where a plurality of levels are being measured, as the liquid 355 represented as 355' in FIG. 4a comes in close proximity to electrodes 340 and 350 from each cluster of electrodes 340 and 350 the presence of the liquid 355 at that level will be detected.

What is claimed is:

1. A capacitive means for measuring the level of a liquid comprising a container at least a portion of which comprises dielectric material, at least one cluster of at least two electrodes each of which is disposed on an outer surface of said portion of said container, a means electrically coupled to at least one of said electrodes of said cluster for supplying an electrical signal thereto, and a means for shunting said electrical signal to ground potential when said liquid is in close proximity to at least one of said electrodes of said cluster.

2. The capacitive means as recited in claim 1 wherein said shunting means includes said liquid.

3. The capacitive means as recited in claim 1 wherein said shunting means includes at least one of said electrodes of said cluster.

4. The capacitive means as recited in claim 1 further comprising a means electrically coupled to at least one of said electrodes of said cluster for detecting said level of said liquid in response to said shunting of said electrical signal.

5. The capacitive means as recited in claim 1 wherein at least one wall of said container comprises dielectric material.

6. The capacitive means as recited in claim 8 wherein a first and second electrode of said cluster are disposed on an outer surface of said wall.

7. The capacitive means as recited in claim 6 wherein said first electrode is disposed in parallel relation to said second electrode.

8. The capacitive means as recited in claim 6 wherein said first electrode is disposed in spaced parallel relation to said second electrode.

9. The capacitive means as recited in claim 6 wherein a third electrode of said cluster is disposed on said wall in spaced relation to said first and second electrodes.

10. The capacitive means as recited in claim 9 wherein said third electrode is disposed on an outer surface of said wall.

11. The capacitive means as recited in claim 9 wherein said third electrode is disposed on an inner surface of said wall in spaced parallel relation to said first and second electrodes.

12. The capacitive means as recited in claim 1 wherein at least two walls of said container comprise dielectric material.

13. The capacitive means as recited in claim 12 wherein a first electrode of said cluster is disposed on an outer surface of one of said walls and a second electrode of said cluster is disposed on an outer surface of another of said walls in spaced parallel relation to said first electrode of said cluster.

14. The capacitive means as recited in claim 1 wherein at least two clusters of at least two electrodes are vertically situated adjacent said container at various intervals whereby a plurality of levels of said liquid may be measured.

15. A method for measuring the level of a liquid comprising the steps of providing a container at least a portion of which comprises a dielectric material, disposing at least two electrodes in spaced relation on an outer surface of said portion of said container, electrically coupling at least one of said electrodes to a means for supplying an electrical signal whereby said electrical signal is capacitively transmitted between said electrodes, and shunting said electrical signal to ground potential when said liquid is in close proximity to at least one of said electrodes whereby a desired liquid level may be detected.

16. The method as recited in claim 15 wherein said step of providing said container includes providing said container with at least one wall of dielectric material.

17. The method as recited in claim 16 wherein said step of disposing said electrodes includes disposing a first and second electrode of said cluster on an outer surface of said wall.

18. The method as recited in claim 17 wherein said step of disposing said electrodes further includes disposing said first electrode in parallel relation to said second electrode.

19. The method as recited in claim 17 wherein said step of disposing said electrodes further includes disposing said first electrode in spaced parallel relation to said second electrode.

20. The method as recited in claim 17 wherein said step of disposing said electrodes further includes disposing a third electrode of said cluster on said wall in spaced relation to said first and second electrodes.

21. The method as recited in claim 20 wherein said step of disposing said third electrode includes disposing said third electrode on an inner surface of said wall.

22. The method as recited in claim 20 wherein said step of disposing said third electrode includes disposing said third electrode on an outer surface of said wall in spaced parallel relation to said first and second electrodes.

23. The method as recited in claim 15 wherein said step of providing said container includes providing said container with at least two walls of dielectric material.

24. The method as recited in claim 23 wherein said step of disposing said electrodes includes disposing a first electrode of said cluster on an outer surface of one of said walls and a second electrode of said cluster on an outer surface of another of said walls in spaced relation to said first electrode.

25. The method as recited in claim 15 wherein said step of shunting said electrical signal when said liquid is in close proximity to said electrode includes grounding said liquid at ground potential.

26. The method as recited in claim 15 wherein said step of shunting said electrical signal when said liquid is in close proximity to said electrode includes grounding at least one of said electrodes of said cluster at ground potential.

27. The method as recited in claim 15 further comprising the step of detecting said level of said liquid in response to said shunting of said electrical signal when said liquid is in close proximity to said electrode.

* * * * *